(12) United States Patent
Lajiness et al.

(10) Patent No.: US 11,999,506 B2
(45) Date of Patent: Jun. 4, 2024

(54) CAMERA CORE MONITOR USING GRADIENT FILTER

(71) Applicant: Rockwell Collins, Inc., Cedar Rapids, IA (US)

(72) Inventors: Gregory G. Lajiness, West Linn, OR (US); Brandon E. Wilson, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 172 days.

(21) Appl. No.: 17/176,931

(22) Filed: Feb. 16, 2021

(65) Prior Publication Data

US 2022/0258882 A1 Aug. 18, 2022

(51) Int. Cl.
*B64D 47/08* (2006.01)
*G01C 11/02* (2006.01)

(52) U.S. Cl.
CPC .............. *B64D 47/08* (2013.01); *G01C 11/02* (2013.01)

(58) Field of Classification Search
None
See application file for complete search history.

(56) References Cited

U.S. PATENT DOCUMENTS

| | | | |
|---|---|---|---|
| 7,355,179 B1 * | 4/2008 | Wood | G06T 7/001 250/339.11 |
| 8,248,454 B2 | 8/2012 | Thielman | |
| 8,699,781 B1 | 4/2014 | Bold | |
| 9,847,047 B2 | 12/2017 | Wu et al. | |
| 10,109,054 B1 | 10/2018 | Wilson et al. | |
| 10,769,053 B2 | 9/2020 | Thangaraj et al. | |
| 2016/0291222 A1 * | 10/2016 | Vermeirsch | G03B 21/142 |
| 2019/0075290 A1 | 3/2019 | Dubey et al. | |
| 2019/0253603 A1 | 8/2019 | Miyagaki et al. | |
| 2020/0177807 A1 * | 6/2020 | Kurihara | H04N 5/343 |

FOREIGN PATENT DOCUMENTS

WO 2019092413 A1 5/2019

OTHER PUBLICATIONS

Extended Search Report in European Application No. 22157007.0 dated Jul. 18, 2022, 8 pages.

* cited by examiner

*Primary Examiner* — Heather R Jones
(74) *Attorney, Agent, or Firm* — Suiter Swantz IP

(57) ABSTRACT

An imaging system for an aircraft is disclosed. The imaging system comprises one or more image sensors configured to image a surrounding environment of the aircraft, an artifact pattern on an optical component in an optical path of the one or more image sensors, and a controller communicatively coupled to the one or more image sensors. The controller includes one or more processors configured to execute program instructions causing the one or more processors to: receive an image of the surrounding environment of the aircraft from the one or more image sensors, wherein the image includes features of the artifact pattern, extract the features of the artifact pattern from the image, and determine an orientation of the features of the artifact pattern in the image with respect to a calibration artifact pattern.

8 Claims, 7 Drawing Sheets

CAMERA CORE MONITOR USING GRADIENT FILTER

SUMMARY

An imaging system for an aircraft is disclosed in accordance with one or more illustrative embodiments of the present disclosure. In one illustrative embodiment, the imaging system comprises one or more image sensors configured to image a surrounding environment of the aircraft. In another illustrative embodiment, the imaging system comprises an artifact pattern on an optical component in an optical path of the one or more image sensors. In another illustrative embodiment, the imaging system comprises a controller communicatively coupled to the one or more image sensors. The controller includes one or more processors configured to execute program instructions causing the one or more processors to: receive an image of the surrounding environment of the aircraft from the one or more image sensors, wherein the image includes features of the artifact pattern, extract the features of the artifact pattern from the image, and determine an orientation of the features of the artifact pattern in the image with respect to a calibration artifact pattern.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
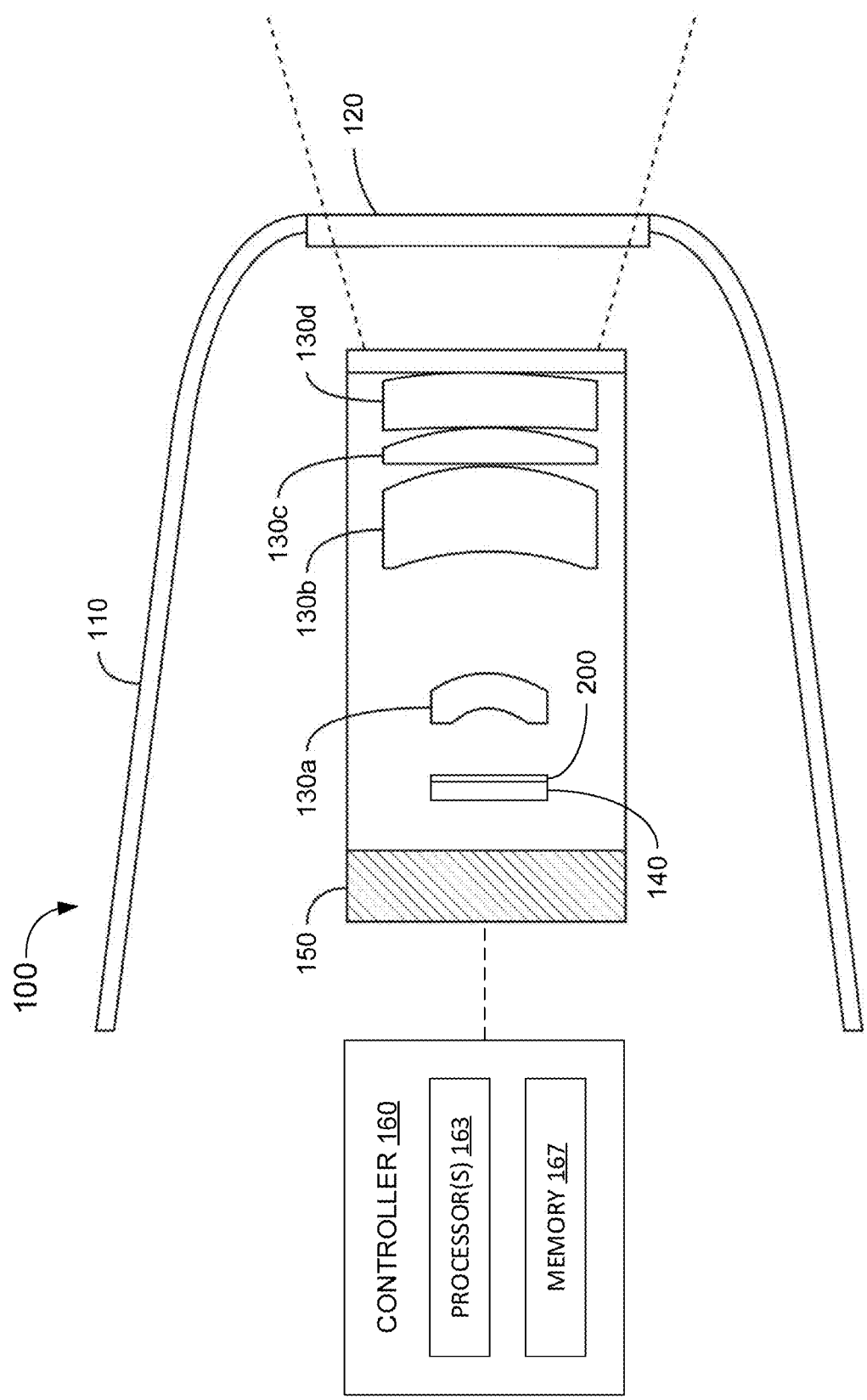
FIG. 1 is a diagram view of an imaging system including an artifact pattern on a window, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

A conventional method of measuring the orientation (i.e., misalignment) of an image captured by an aircraft image sensor entails using intrinsic manufacturing flaws in the image sensor. Prior generations of image sensors are more prone to damage from cosmic rays due to relatively large pixels and less sophisticated manufacturing methods, which produce significant variability in pixel responsivities. In contrast, modern complementary metal oxide semiconductor (CMOS) technology is driving toward higher resolutions and more consistent manufacturing methods where the reliance on such intrinsic flaws or variability is not practical for measuring image orientation. Since it is not practical to use conventional orientation monitoring techniques that employ dead pixels or fixed pattern noise (FPN) in the image sensors, it may be desirable to employ techniques that do not rely on manufacturing flaws.

Embodiments of the present disclosure are directed to an artifact pattern in an optical path of image sensors for an aircraft enhanced vision system (EVS). The EVS may be substantially similar to the EVS-3000 or EVS-3600 developed by Rockwell Collins, Inc. (Cedar Rapids, IA). The artifact pattern may be a gradient pattern (e.g., gradual darkening from a dark to light) on a lens, window, or combiner surface in the optical path of the one or more image sensors. The artifact pattern may have an orientation that introduces asymmetrical features in the image captured by the one or more image sensors. Once an image is captured, the features of the artifact pattern may be extracted and examined to determine the orientation of the image with respect to a calibration artifact pattern. For example, the artifact pattern may be rotated, translated, or flipped horizontally or vertically (i.e., reflected) with respect to the calibration artifact pattern. In some embodiments, an algorithm may determine which operations are required to align or overlay the features of the artifact pattern and the reference pattern (e.g., degree of rotation, distance of translation, etc.). If the extracted features of the artifact pattern do not match the reference pattern, then the captured image may be flagged as misleading or misaligned and removed from the multi-camera fusion output (e.g., the output presented on a display to a pilot of the aircraft).

FIG. 1 is a diagram view of an imaging system 100 for an aircraft, in accordance with one or more embodiments of the present disclosure. The imaging system 100 may be in a cavity in the body 110 of the aircraft and may include a window 120, lenses 130a-d, and one or more image sensors 150.

The window 120 may be transparent and may be adhered to the body 110 such that the cavity is sealed from the outside environment. The lenses 130a-d may be configured to direct light entering the cavity to the one or more image sensors 150. The one or more image sensors 150 may comprise a focal plane array (FPA) including an array of pixels (e.g., millions of pixels) and may be located at an image plane (i.e., field plane) of the imaging system (e.g., conjugate to an object plane in the surrounding environment). The one or more image sensors 150 may comprise a CMOS photodiode array, although the present disclosure is not limited thereto. For example, in some embodiments, the one or more image sensors 150 may comprise a charge-coupled device (CCD) photodiode array. The one or more image sensors 150 may comprise one or more monochrome or RGB cameras configured to image optical wavelengths, and/or one or more infrared (IR) cameras configured to image short-wave IR (SWIR) and long-wave IR (LWIR) wavelengths. In some embodiments, the aircraft may include multiple imaging systems 100 where each image sensor 140 is a different type of camera. For example, the aircraft may include an RGB sensor 140, a SWIR sensor 140, and a LWIR sensor 140. The images captured by each type of sensor may be fused or combined for an EVS output (i.e., a multi-spectral fusion video stream viewable to a pilot of the aircraft).

An artifact pattern 200 may be adhered to a surface of an optical component in the optical path of the one or more sensors 150. For example, as shown in FIG. 1, the artifact pattern 200 may be adhered, affixed or attached to a surface of a transparent window 140. In other embodiments, the artifact pattern 200 may be adhered to the surface of the lens 130a. The artifact pattern 200 may be asymmetrical, or, in some embodiments, may have one or more axes of symmetry. The artifact pattern 200 may be a semi-transparent coating, for example, a gradient pattern having a relatively opaque darker portion that transitions to a relatively transparent lighter portion. In some embodiments, the gradient pattern is a stenciled, absorbant, oxide coating (e.g., having a loss of about 10%). In some embodiments, the gradient pattern is a graduated neutral density (ND) filter. In other embodiments, the artifact pattern 200 may be a grating, a speckle pattern, a geometric shape, etc. In some embodiments, a mechanism may be configured to translate the window 140 and/or the artifact pattern 200 along an axis orthogonal to the optical path (for example, a retractable holder for the window 140 actuated manually or electromechanically) or along an axis normal or parallel to the optical path (e.g., using a sliding mechanism). In some embodiments, the artifact pattern 200 comprises a thermochromic or electrochromic material that changes color or opacity responsive to heat or electricity applied thereto.

It may be advantageous to employ a gradient pattern instead of a geometrical shape for the artifact pattern 200, since a gradient pattern may be simple to extract (e.g., by image processing) while preserving features of the surrounding environment in the image, may occupy a relatively small portion of the field-of-view of the image, may be employed in limited visibility conditions such as night-time visual meteorological conditions (VMC), and may be highly sensitive to misalignment measurements (e.g., a rotational misalignment as small as 0.25° may be detected).

In one experiment demonstrating the feasibility of a gradient artifact pattern, a commercial-off-the-shelf (COTS) lens was used with an 7.1 MP camera employing a CMOS image sensor. An ND filter (gradient pattern) was varied in position in front of the image sensor and natural light was used as a stimulus. The images captured by the camera indicated that the black and white levels of the images varied nonlinearly until the ND filter was placed 32 mm in front of the image sensor, after which the black and white levels of the images were constant (in other words, the features of the artifact pattern were constant in intensity and resolvable when the artifact pattern was placed about 30-70 mm from the image sensor). Although this experiment demonstrated the feasibility of placing the artifact pattern 200 on a first optical element (e.g., window 120) of an optical assembly, other experiments demonstrated the feasibility of placing the artifact pattern 200 on a last optical element (e.g., window 140) of the optical assembly. It is contemplated herein that the artifact pattern 200 may be placed on any optical element in an optical assembly, and that the optimal location for the artifact pattern 200 may be selected based on experimentation. For example, the artifact pattern 200 may be placed on a lens (i.e., a medial optical element between the first optical element and the last optical element in an optical assembly).

In some embodiments, a controller 160 (e.g., computer or computing system) including one or more processors 163 and a memory 167 may be communicatively coupled to the one or more image sensors 150. Program instructions may be stored on the memory 167, that, when executed by the one or more processors 163, cause the one or more processors 163 to perform functions, procedures, algorithms, methods, etc. described in the present disclosure. For example, in some embodiments, the program instructions may cause the one or more processors 163 to receive an image of the surrounding environment of the aircraft from the one or more image sensors 150. The captured image may include asymmetrical, low spatial frequency features of the artifact pattern 200. The features of the artifact pattern 200 may then be extracted from the image (e.g., using an image processing algorithm) and compared to a calibration artifact pattern (i.e., a reference artifact pattern indicating a correct orientation) to determine the orientation of the captured image.

The one or more processors 163 of the controller 160 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs). In this sense, the one or more processors 163 may include any device configured to execute algorithms and/or instructions (e.g., program instructions stored in memory). In one embodiment, the one or more processors 132 may be embodied in an embedded system of an aircraft EVS.

The memory medium 167 may include any storage medium known in the art suitable for storing program instructions executable by the associated one or more processors 163. For example, the memory medium 167 may include a non-transitory memory medium. By way of another example, the memory medium 167 may include, but is not limited to, a read-only memory (ROM), a random-access memory (RAM), a magnetic or optical memory device (e.g., disk), a magnetic tape, a solid-state drive and the like. It is further noted that memory medium 167 may be housed in a common controller housing with the one or more processors 163. In one embodiment, the memory medium 167 may be located remotely with respect to the physical location of the one or more processors 163 and controller 160. For instance, the one or more processors 163 of the controller 160 may access a remote memory (e.g., server), accessible through a network (e.g., internet, intranet and the like).

Figure 2A:
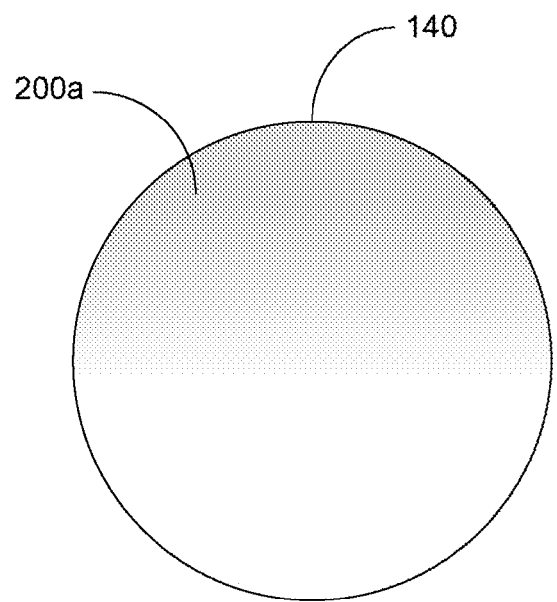
FIGS. 2A-2B are drawings illustrating gradient artifact patterns, in accordance with one or more embodiments of the present disclosure.
Figure 2B:
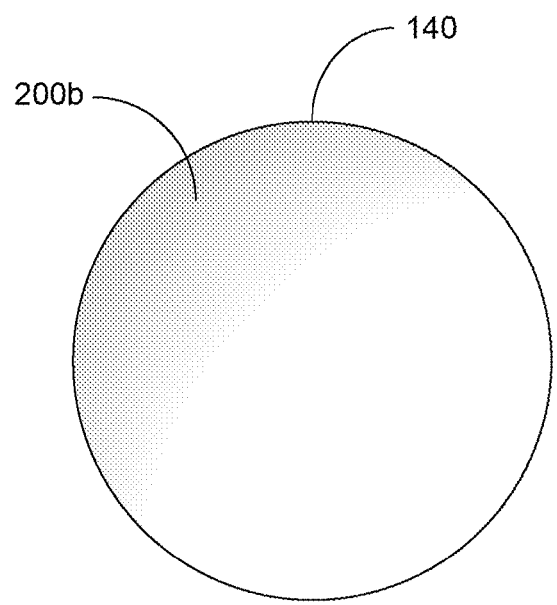

FIG. 2A is a drawing illustrating a gradient artifact pattern 200a adhered to the window 140, in accordance with one or more embodiments of the present disclosure. Although the gradient artifact pattern 200a as shown is vertically symmetric, it is noted that the gradient artifact pattern 200a may be asymmetrical. In some embodiments, the gradient pattern may occupy of from about 1% to 99% of the field of view (FOV) captured at the image plane by the image sensors 150, although it may be advantageous for the gradient pattern to occupy a relatively smaller portion of the FOV (for example, 10% to 50% of the FOV). FIG. 2B is a drawing illustrating an alternative gradient artifact pattern 200b adhered to the window 140, in accordance with one or more embodiments of the present disclosure. In this embodiment, the gradient pattern has a crescent shape and is more diagonally oriented across the FOV.

Figure 3A:
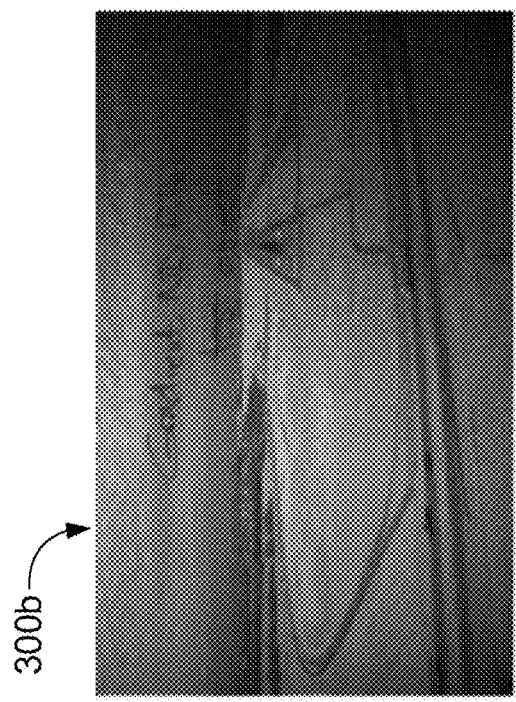
FIGS. 3A-3D are images showing the extraction of features of a gradient artifact pattern, in accordance with one or more embodiments of the present disclosure.
Figure 3B:
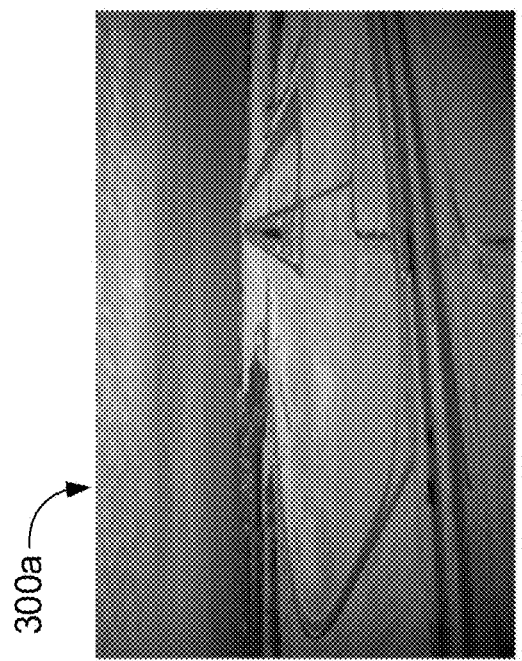
Figure 3C:
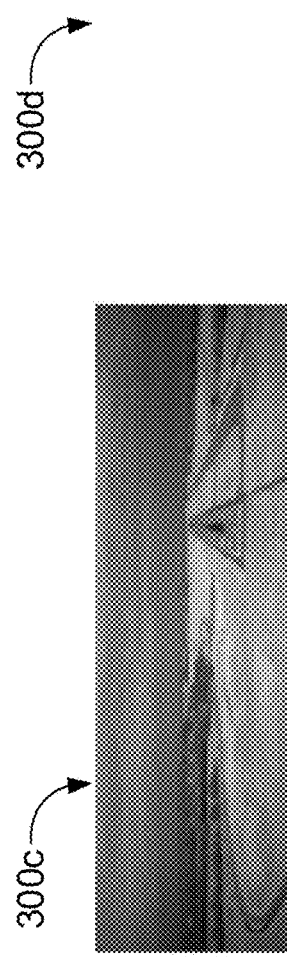
Figure 3D:
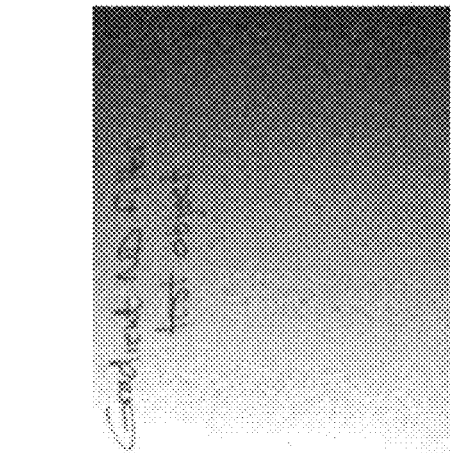

FIGS. 3A-3D show a simulation of the extraction of features of a gradient artifact pattern from an SWIR image, in accordance with one or more embodiments of the present disclosure. FIG. 3A shows an SWIR image 300a of a runway. FIG. 3B shows an SWIR image 300b including the runway and features of a gradient artifact pattern (e.g., ND filter). FIG. 3C shows an SWIR image 300c including the runway after the gradient artifact pattern is extracted. As shown, the image 300c shown in FIG. 3C is substantially similar to the original image 300a shown in FIG. 3A. FIG. 3D shows an image 300d including the extracted features of the gradient artifact pattern isolated from the image 300c. The extracted features may then be compared to a calibration artifact pattern to measure the orientation of the original image 300a.

Figure 4A:
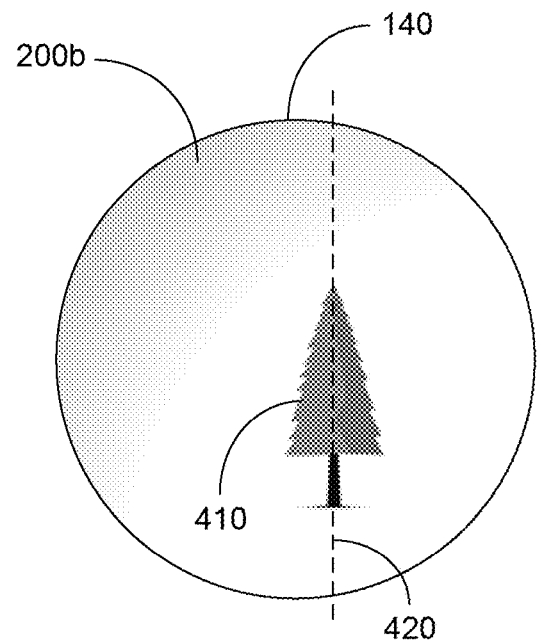
FIGS. 4A-4B are conceptual drawings illustrating the rotation of an artifact pattern with respect to a calibration artifact pattern, in accordance with one or more embodiments of the present disclosure.
Figure 4B:
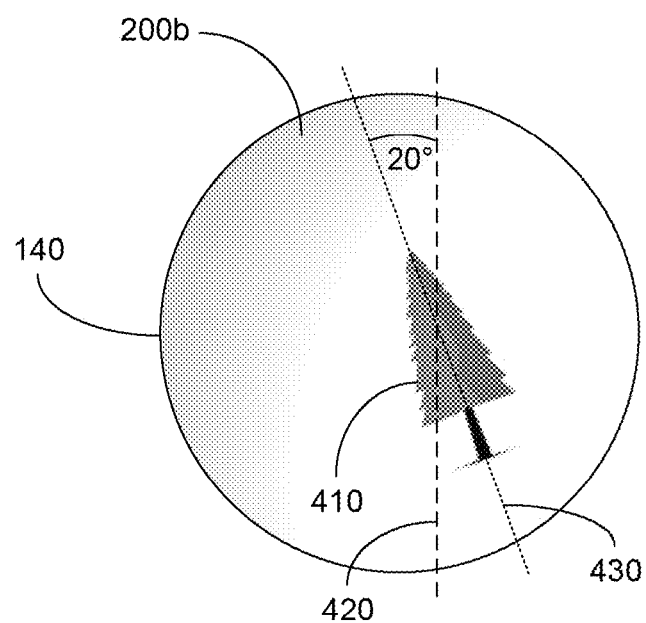

FIGS. 4A-4B are conceptual drawings illustrating the rotation of the artifact pattern 200b with respect to a calibration artifact pattern, in accordance with one or more embodiments of the present disclosure. FIG. 4A illustrates an image of an object 410 and features of the artifact pattern 200b on the window 140. The image of FIG. 4A represents an image of the object 410 with a correct orientation 420, and the artifact pattern 200b that appears in the image of FIG. 4A may be used as a calibration artifact pattern (e.g., reference artifact pattern). FIG. 4B illustrates an image of the object 410 having an orientation 430 that is misaligned by rotation from the correct orientation 420. The artifact pattern 200b may be extracted from the image of FIG. 4B and may be compared with the calibration artifact pattern of FIG. 4A to determine the rotational misalignment (e.g., about 20°). Responsive to the rotational misalignment being greater than a threshold rotational misalignment within a selected tolerance (e.g., ±0.05°), the image of FIG. 4B may be removed from the EVS video stream (e.g., removed from the stream presented on a display to a pilot of the aircraft).

Figure 5A:
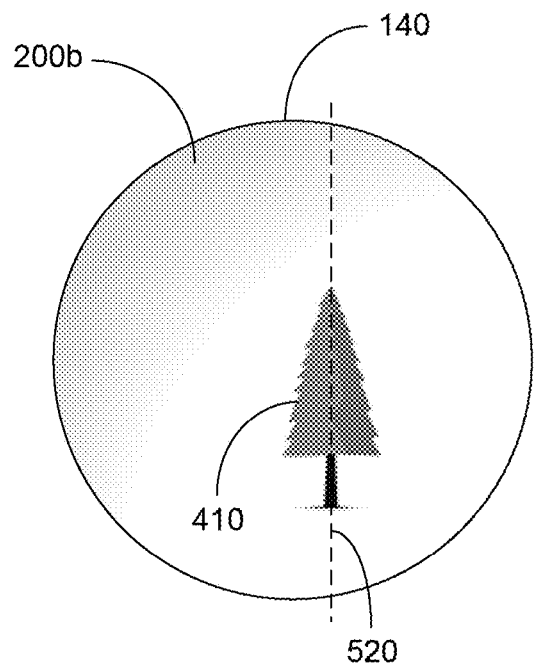
FIGS. 5A-5B are conceptual drawings illustrating the translation of an artifact pattern with respect to a calibration artifact pattern, in accordance with one or more embodiments of the present disclosure.
Figure 5B:
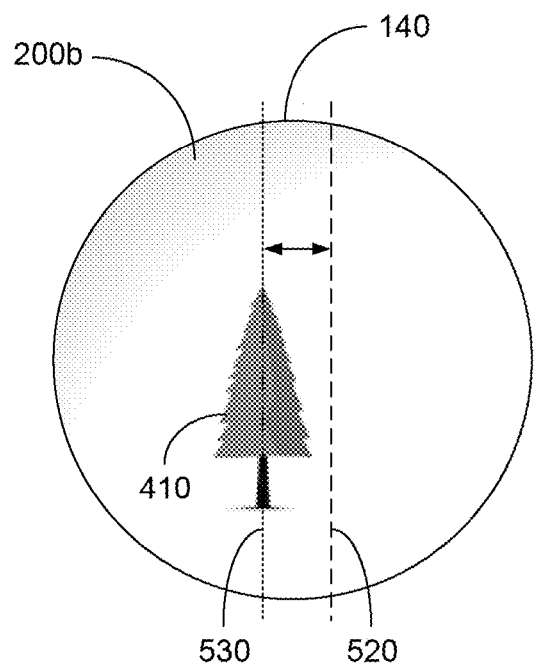

FIGS. 5A-5B are conceptual drawings illustrating the translation of the artifact pattern 200b with respect to a calibration artifact pattern, in accordance with one or more embodiments of the present disclosure. FIG. 5A illustrates an image of an object 410 and features of the artifact pattern 200b on the window 140. The image of FIG. 5A represents an image of an object 410 having a correct orientation 520, and the artifact pattern 200b that appears in the image of FIG. 5A may be used as a calibration artifact pattern (e.g., reference artifact pattern). FIG. 5B illustrates an image of the object 410 having an orientation 530 that is misaligned by translation from the correct orientation 520. The artifact pattern 200b may be extracted from the image of FIG. 5B and may be compared with the calibration artifact pattern of FIG. 5A to determine the translational misalignment. Responsive to the translational misalignment being greater than a threshold translational misalignment within a selected tolerance (e.g., ±10 pixels), the image of FIG. 5B may be removed from the EVS video stream (e.g., removed from the stream presented on a display to a pilot of the aircraft).

Figure 6A:
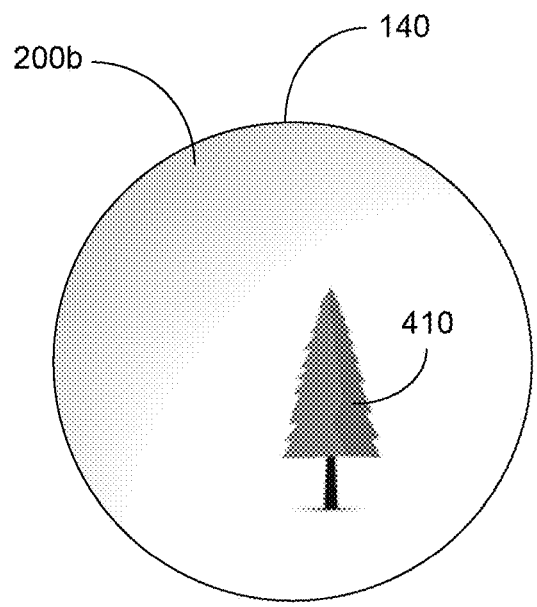
FIGS. 6A-6B are conceptual drawings illustrating the reflection of an artifact pattern with respect to a calibration artifact pattern, in accordance with one or more embodiments of the present disclosure.
Figure 6B:
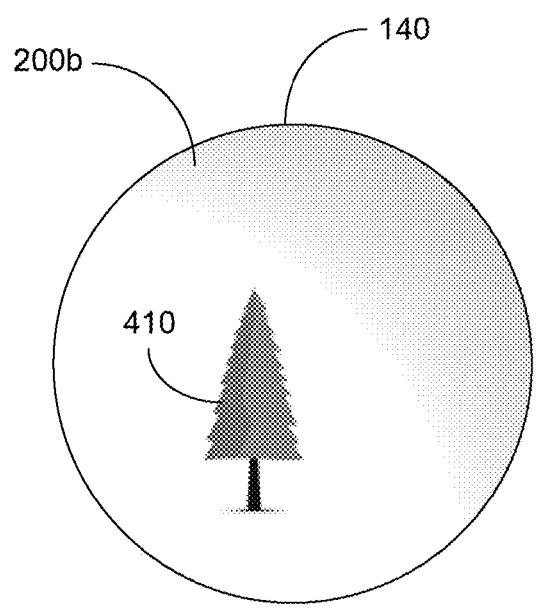

FIGS. 6A-6B are conceptual drawings illustrating the reflection of the artifact pattern 200b with respect to a calibration artifact pattern, in accordance with one or more embodiments of the present disclosure. FIG. 6A illustrates an image of an object 410 and features of the artifact pattern 200b on the window 140. The image of FIG. 6A represents an image of an object 410 having a correct orientation, and the artifact pattern 200b that appears in the image of FIG. 6A may be used as a calibration artifact pattern (e.g., reference artifact pattern). FIG. 6B illustrates an image of the object 410 having an orientation 530 that is misaligned by reflection (mirror-symmetry) from the correct orientation. The artifact pattern 200b may be extracted from the image of FIG. 6B and may be compared with the calibration artifact pattern of FIG. 6A to determine the reflection misalignment. Responsive to a reflection misalignment being measured, the image of FIG. 5B may be removed from the EVS video stream (e.g., removed from the stream presented on a display to a pilot of the aircraft).

Figure 7:
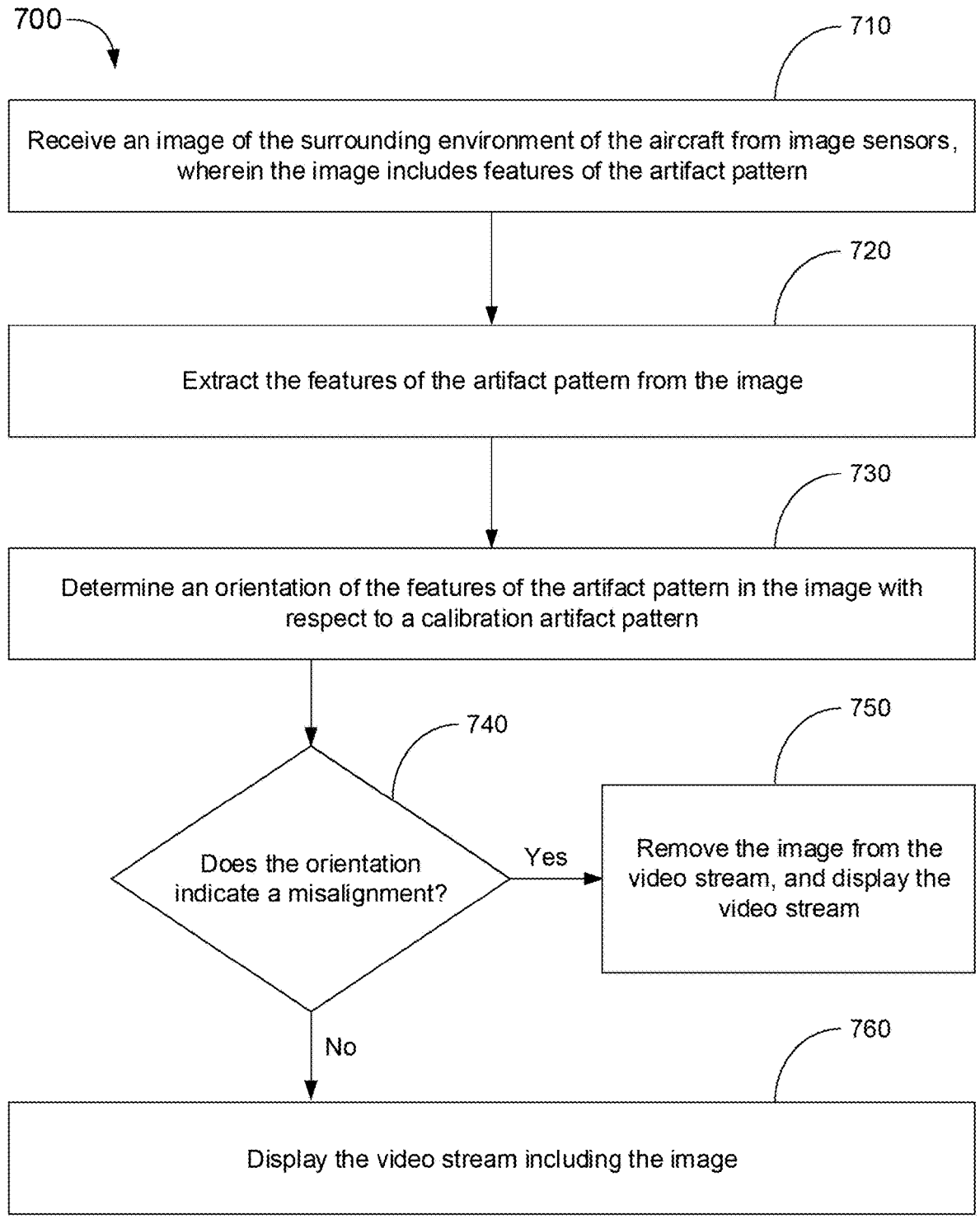
FIG. 7 is a flowchart illustrating a method of determining the orientation of an image, in accordance with one or more embodiments of the present disclosure.

FIG. 7 is a flowchart 700 illustrating a method of determining the orientation of an image, in accordance with one or more embodiments of the present disclosure.

At step 710, an image of the surrounding environment of the aircraft may be received (e.g., by the controller 160) from one or more image sensors (e.g., image sensors 140).

The image may include asymmetrical, low spatial frequency features of an artifact pattern (e.g., a gradient pattern 200 on a window 140).

At step 720, the features of the artifact pattern may then be extracted from the image (e.g., using an image processing algorithm).

At step 730, the features of the artifact pattern may be compared to a calibration artifact pattern (i.e., a reference artifact pattern indicating a correct orientation) to determine the orientation of the artifact pattern and the captured image.

At step 740, responsive to the orientation of the artifact pattern indicating a misalignment (e.g., a rotational, translational, or reflection misalignment within a selected tolerance), the method may proceed to step 750, and responsive to the orientation of the artifact pattern indicating no misalignment (e.g., a correct alignment), the method may proceed to step 760.

At step 750, responsive to a misalignment being detected in the image, the image may be removed from the video stream (e.g., EVS video stream) presented on a display to a user of the aircraft. Alternatively, at step 760, responsive to no misalignment being detected in the image, the image may be left in the video stream.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An imaging system for an aircraft, comprising:
   one or more image sensors configured to image a surrounding environment of the aircraft;
   an artifact pattern on an optical component in an optical path of the one or more image sensors, wherein the artifact pattern is a tangible coating physically on the optical component, wherein the artifact pattern comprises a gradient pattern, wherein the gradient pattern has a lighter portion and a darker portion; and
   a controller communicatively coupled to the one or more image sensors, wherein the controller includes one or more processors configured to execute program instructions causing the one or more processors to:
   receive an image of the surrounding environment of the aircraft from the one or more image sensors, wherein the image includes features of the artifact pattern;
   extract the features of the artifact pattern from the image; and
   determine an orientation of the features of the artifact pattern in the image with respect to a calibration artifact pattern comprising comparing an axis of symmetry of the features of the artifact pattern in the image with an axis of symmetry of the calibration artifact pattern, wherein the determined orientation of the image with respect to the calibration artifact pattern indicates a reflection or rotation of the image with respect to the calibration artifact pattern,
   wherein, responsive to the orientation of the features of the artifact pattern indicating a misalignment, the image is removed from a video stream configured to be presented on a display to a user of the aircraft.

2. The imaging system of claim 1, wherein the optical component is a lens or a window in the optical path of the one or more image sensors.

3. The imaging system of claim 1, wherein the artifact pattern is asymmetrical.

4. The imaging system of claim 1, wherein the artifact pattern is diagonally symmetric.

5. The imaging system of claim 1, wherein the artifact pattern is a neutral density (ND) filter.

6. The imaging system of claim 1, wherein the orientation of the features of the artifact pattern indicates a translation of the image with respect to the calibration artifact pattern.

7. The imaging system of claim 1, wherein the one or more image sensors comprise a complementary metal oxide semiconductor (CMOS) photodiode array.

8. The imaging system of claim 1, wherein, responsive to the orientation of the features of the artifact pattern indicating a misalignment, the image is removed from a video stream configured to be presented on a display to a user of the aircraft.

* * * * *